US008817606B2

(12) United States Patent  
Ye et al.

(10) Patent No.: US 8,817,606 B2  
(45) Date of Patent: Aug. 26, 2014

(54) MANAGING OVERLOAD OF AN ACCESS MEDIUM FOR A COMMUNICATION SYSTEM

(75) Inventors: Sigen Ye, Randolph, NJ (US); Qinqing Zhang, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1158 days.

(21) Appl. No.: 11/486,409

(22) Filed: Jul. 13, 2006

(65) Prior Publication Data  
US 2008/0013462 A1 Jan. 17, 2008

(51) Int. Cl.  
H04L 12/26 (2006.01)  
H04W 72/12 (2009.01)

(52) U.S. Cl.  
CPC .................................. *H04W 72/1252* (2013.01)  
USPC .......................................................... 370/229

(58) Field of Classification Search  
CPC ................................................. H04W 72/1252  
USPC ............ 370/229–237, 441–444; 455/450, 453  
See application file for complete search history.

(56) References Cited

U.S. PATENT DOCUMENTS

| | | | | |
|---|---|---|---|---|
| 4,497,978 A * | 2/1985 | Schoute et al. | ................ | 379/279 |
| 5,933,481 A * | 8/1999 | MacDonald | ................. | 379/137 |
| 6,044,072 A * | 3/2000 | Ueda | ............... | 370/335 |
| 6,112,101 A * | 8/2000 | Bhatia et al. | .................. | 455/512 |
| 6,118,997 A * | 9/2000 | Kim et al. | .................... | 455/424 |
| 6,128,506 A | 10/2000 | Knutsson et al. | | |
| 6,195,338 B1 * | 2/2001 | Decker | ........................ | 370/252 |
| 6,278,882 B1 * | 8/2001 | Choi | .............................. | 455/453 |
| 6,370,572 B1 * | 4/2002 | Lindskog et al. | ............. | 709/223 |
| 6,665,272 B1 * | 12/2003 | Pankaj et al. | .................. | 370/252 |
| 6,754,501 B1 * | 6/2004 | McRae et al. | ................. | 455/453 |
| 6,999,759 B2 * | 2/2006 | Harris et al. | ................... | 455/418 |

(Continued)

FOREIGN PATENT DOCUMENTS

| | | |
|---|---|---|
| CN | 1533193 A | 9/2004 |
| ep | 0475698 A2 | 3/1992 |

(Continued)

OTHER PUBLICATIONS

International Preliminary Report on Patentability for International Application No. PCT/US2007/015853 mailed Jan. 22, 2009.

(Continued)

*Primary Examiner* — Dmitry H Levitan  
(74) *Attorney, Agent, or Firm* — Carlson, Gaskey & Olds

(57) ABSTRACT

An overload or congestion condition on an access medium (24) of a communication network (22) is indicated by at least one condition that indicates an amount of access attempts on the access medium (24) corresponds to congestion or overload of a capacity of the access medium (24). Example conditions in disclosed embodiments include an occupancy level of the access medium, an average number of access probes associated with successful access attempts, a relationship between received power and interference, an emergency condition and network configuration or maintenance procedures. In a disclosed example, when congestion or overload occurs, at least one technique is implemented to reduce the congestion or overload for stabilizing the access medium. Disclosed example techniques for this include throttling the number of access attempt by reducing the number of users making access attempts or the frequency of user access attempts. Another example technique includes adjusting at least one access medium parameter that will reduce the access attempt traffic.

20 Claims, 2 Drawing Sheets

(56) References Cited

U.S. PATENT DOCUMENTS

| | | | |
|---|---|---|---|
| 7,107,061 B1* | 9/2006 | Tontiruttananon et al. | 455/453 |
| 7,961,616 B2 | 6/2011 | Jain et al. | |
| 2002/0082032 A1* | 6/2002 | Hunzinger | 455/510 |
| 2002/0173316 A1* | 11/2002 | Jang et al. | 455/453 |
| 2003/0099197 A1* | 5/2003 | Yokota et al. | 370/230 |
| 2004/0180677 A1 | 9/2004 | Harris et al. | |

FOREIGN PATENT DOCUMENTS

| | | |
|---|---|---|
| EP | 1077580 A1 | 2/2001 |
| EP | 1489876 A1 | 12/2004 |
| JP | H06-259217 | 9/1994 |
| JP | 10308978 A | 11/1998 |
| JP | 2000224651 A | 8/2000 |
| WO | 2004084004 A2 | 9/2004 |

OTHER PUBLICATIONS

International Search Report and Written Opinion of the International Searching Authority for International Application No. PCT/US2007/015853 mailed Apr. 18, 2008.

* cited by examiner

MANAGING OVERLOAD OF AN ACCESS MEDIUM FOR A COMMUNICATION SYSTEM

FIELD OF THE INVENTION

This invention relates to communication. More particularly, this invention relates to managing an access medium in a communication system.

DESCRIPTION OF THE RELATED ART

Communication systems often include an access medium through which individual devices gain access to the resources of the system for purposes of conducting a communication session. In wireless communication systems, for example, the wireless access terminal uses a common channel that all users or terminals must access to gain access to the communication system or network. For example, a mobile access terminal typically sends a connection request to a base station through an access channel. Such requests are sent randomly and several access terminals may be sending a request on the same access channel at the same frequency. In the case of wired local area networks, terminals connected to the lines of the network may need to communicate with one another or with a common control system. In such a scenario there is contention for the common access medium.

In the case of random access where terminals transmit at will, packet collisions on the access medium will happen when two or more terminals transmit at the same time. A number of contention resolution algorithms have been proposed to resolve these collisions.

Access media typically has limited capacity. There typically are a high percentage of failures when the access attempts from access terminals are large in number. This is typically due to the limited access medium capacity. Known random access methods involve retransmitting access probes after a back-off period from a previously failed attempt. The back-off period is typically determined randomly to increase the probability of successful access on the next attempt. Known back-off algorithms and the total number of retransmissions allowed for each access attempt are configurable parameters within a communication system.

When there are many access attempts, the access medium capacity will be overloaded. An overloaded access medium tends to be in an unstable condition where the throughput is low because of the large number of collisions. Under such circumstances, many users try to access the system or network but cannot get through. At the same time, however, the communication system may have adequate capacity to handle all or most of those users and could admit all or most of them. The overload situation on the access medium, however, does not allow the users or terminals to get through and the system or network does not get fully utilized, resulting in degraded performance.

It is desirable to detect an access medium overload situation as early as possible. It is also desirable to have a control mechanism that will return the system to a stable condition if an overload situation occurs. This invention addresses such needs.

SUMMARY OF THE INVENTION

An exemplary method comprises determining whether attempts to access an access medium are above an amount corresponding to consuming a selected percentage of the access medium capacity, which is indicative of a congested or an overload condition.

In one example, an occupancy measurement on the access channel indicates whether the access attempt activity corresponds to an overload condition. In a disclosed example, access medium occupancy is measured during a time interval based on a number of seizures (e.g., captured probes, which correspond to successful access attempts) relative to a capacity of the access medium during a selected time interval, which provides a measurement of the current occupancy.

In another example, the number of probes associated with successful access messages provides information regarding whether there is an overload condition in the access medium. One example includes determining an average number of probes associated with successfully received access messages. The average number of probes provides an indication of the amount of access attempts. When the average number of probes is larger than an appropriate threshold, an overload condition exists.

Another example includes determining a relationship between received power and interference experienced by the communication system For example, where the received power is low and the interference level is high, that provides an indication of a large number of collisions, which is indicative of many access attempts corresponding to an overload condition on the access medium.

Another example includes using a known, anticipated event on the network for predicting when an overload condition may exist. In one example, when there is scheduled network maintenance such as a network configuration procedure or there is an emergency situation, an overload condition on the access medium can be predicted or assumed.

In one example, when an overload condition exists, a technique is implemented to address the situation for restoring the access medium to a stable condition.

One example includes throttling the number of access attempts by informing at least some access terminals or users to at least temporarily stop making access requests.

Another example includes smoothing out traffic bursts on the access medium by reducing the access attempt rate of at least some potential users.

Another example includes adjusting access medium parameters such as the number of probe sequences, the number of probes or the back off time between probes.

The various features and advantages of this invention will become apparent to those skilled in the art from the following detailed description. The drawings that accompany the detailed description can be briefly described as follows.

DETAILED DESCRIPTION

Example embodiments of this invention provide the capability to manage the resources of an access medium. Disclosed example techniques provide an indication of whether an amount of access attempts corresponds to an overload condition on the access medium. Disclosed example techniques for handling such a situation provide for minimizing or eliminating the effects of possible overload, which provides the ability to improve overall system throughput.

Figure 1:
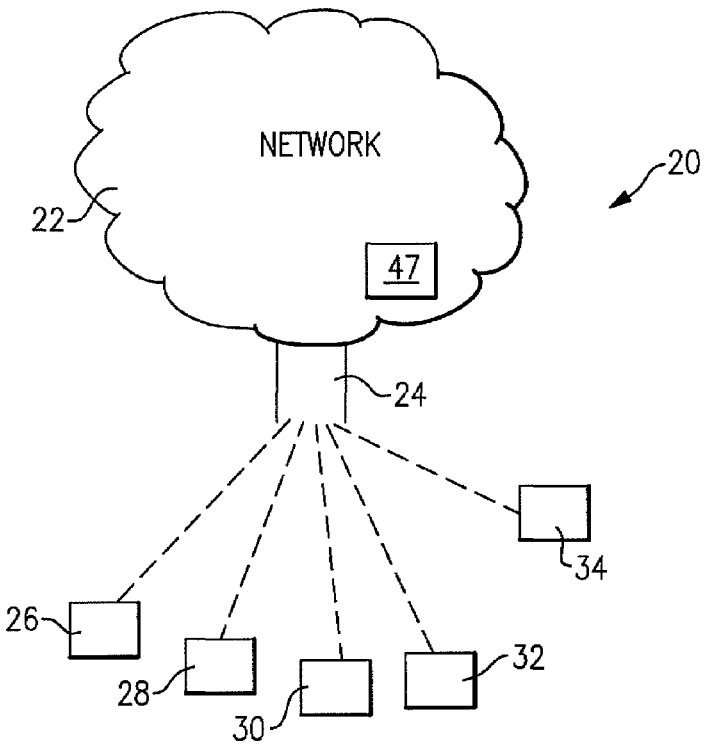
FIG. 1 schematically illustrates a communication system that is useful with an embodiment of this invention.

FIG. 1 schematically shows selected portions of a communication system 20. A network 22 provides communication capabilities to meet the needs of a particular situation. The network 22 has an access medium 24 that facilitates access to the network 22 on behalf of at least one access terminal. The illustrated example includes access terminals 26, 28, 30, 32 and 34.

In one example the network 22 comprises a wireless communication network that operates in a known manner. In such an example, the access terminals 26-34 comprise mobile stations such as cell phones, personal digital assistants or notebook computers, for example. The access medium for a wireless communication network comprises a communication channel, which is facilitated by a base station for example, that the access terminals can access in a known manner for initiating a call or flow. The schematic connections between the access terminals 26-34 in such an example comprise wireless communication links.

In another example, the network 22 is line based and operates in a known manner. In such an example, the access terminals may be computers or other devices associated with the network 22 that gain access to a server or communicate with each other by accessing the access medium 24, which comprises one or more lines (e.g., hardwired connections). The schematic connections between the access terminals 26-34 in one such example comprise hardwired communication links.

In some situations, the number of access attempts from access terminals will approach the capacity of the access medium 24. Under such situations, the access medium 24 may be considered to be overloaded because it cannot allow the access attempts to all get through on the first attempt. Under congested or overloaded conditions, the access attempts from two or more of the access terminals will collide on the access medium resulting in a failed attempt for each of the involved terminals. This is a known condition that occurs for known reasons.

Figure 2:
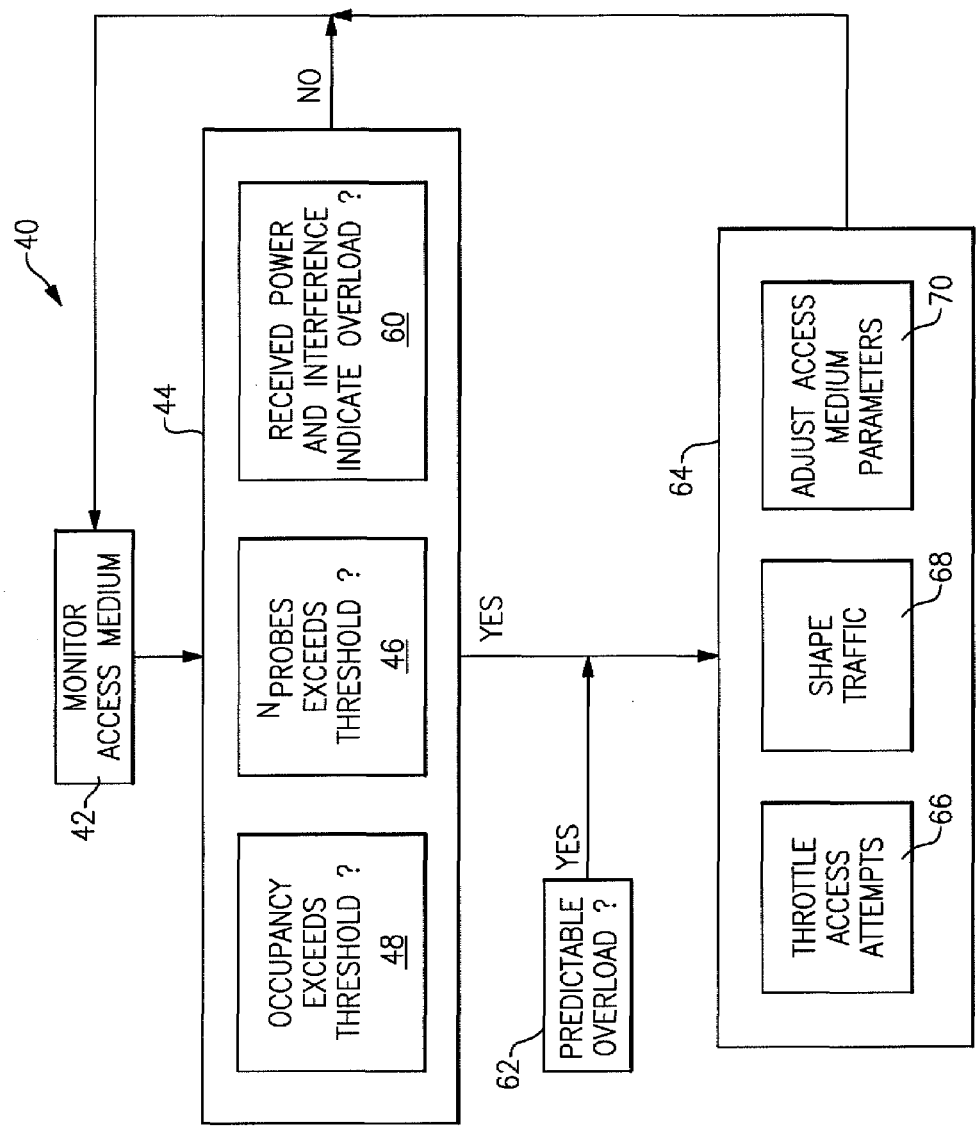
FIG. 2 is a flowchart diagram summarizing example access medium management techniques.

The illustrated example provides the ability to recognize such a situation and to take corrective action to improve throughput and overall system performance. FIG. 2 includes a flow chart diagram 40 that summarizes one example approach. The access medium 24 is monitored at 42 by detecting at least one selected metric. A decision is made at 44 whether the at least one selected metric provides an indication that the current traffic or the amount of access attempts on the access medium is such that the access medium is congested or overloaded.

The illustrated example includes three possible determinations at 44. One example includes selecting one of them for making the decision at 44. Another example includes a combination of two or all three of the possible determinations for making the decision at 44.

One example determination shown at 46 includes determining whether an average number of probes associated with successful access attempts indicates an amount of access attempts corresponding to a congested or overloaded access medium condition. As known, access messages often include a field in the header indicating the number of probes that message has been tried. Each access message typically is sent multiple times and each time corresponds to a probe. Therefore, the probe number indicates how many times a particular access message was tried before it was successful. Larger probe numbers correspond to higher attempt numbers. One example includes using this information as an indication that there is a correspondingly high rate of collisions on the access medium 24, which is causing the relatively high number of retransmissions (e.g., probes).

In one example, the network 22 includes a processor 47 that gathers and processes data regarding the number of probes associated with each successful access message. The average number of probes is compared to a selected threshold that is determined based upon characteristics of the particular network. When the average number of probes is above the threshold, the access medium 24 is congested or overloaded. Those skilled in the art who have the benefit of this description will be able to select an appropriate threshold and an appropriate number of received access messages or an appropriate sampling time for inclusion in a determination of the average number of probes to meet their particular needs.

In the illustrated example, an access medium occupancy measurement or determination is made at 48. In this example, the occupancy of the access channel is determined over a time interval of a selected duration. In one example, the occupancy is determined from the relationship: $\rho = N_{siezures}/CT$, where T is the measurement interval, C is the capacity of the access medium in seizures per second (e.g., how many probes the access medium 24 can handle in a unit of time) and $N_{siezures}$ is the number of successful access attempts (e.g., captured probes) received in T.

In one example, for each detection time interval T, the value of $\rho$ is compared to a selected threshold. If $\rho$ exceeds the threshold, then the access medium 24 is considered overloaded. In one example, the threshold is selected to correspond to the access medium 24 being between approximately 70% and 80% occupied. The random nature of the access attempts from access terminals typically dictates that the total capacity of the access medium will never be reached. Given this description, those skilled in the art will be able to select an appropriate threshold.

Figure 3:
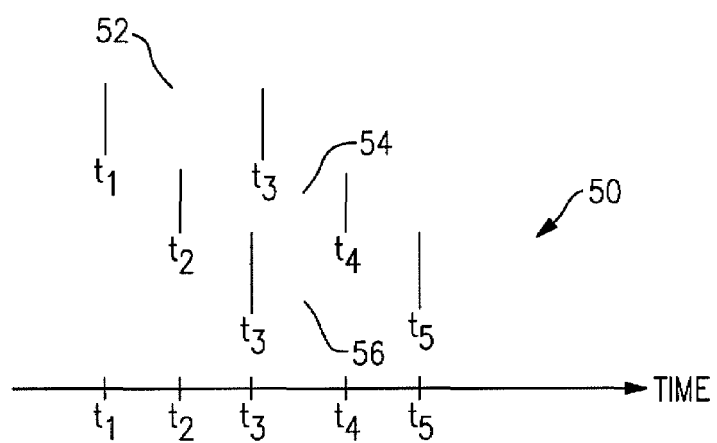
FIG. 3 schematically illustrates a timing strategy useful with one embodiment of this invention.

FIG. 3 includes a timing diagram 50 that shows an example way of utilizing a plurality of equally sized and overlapping measurement intervals T. In this example, a first occupancy measurement interval 52 begins at a time t1 and lasts until a time t3. A second interval 54 begins at the time t2, which is between t1 and t3, and ends at the time t4. A third interval 56 begins at t3 and ends at t5. It can be appreciated that some of the data used for the occupancy determination in the interval 52 will also be used for the determination associated with the interval 54.

Another determination is schematically shown at 60 in the example of FIG. 2. This determination includes comparing received power at an appropriate location in the network 22 with an amount of interference at a correspondingly appropriate location in the network 22. This technique recognizes that measuring occupancy level as done at 48 does not directly indicate the number of collisions occurring as a result of high numbers of access attempts. The network 22 can only accurately determine the number of successful access attempts and cannot know how many access terminals are attempting access or how many attempts are made by each unsuccessful terminal. The technique at 60 utilizes other information to provide an indirect measurement that indicates a condition of the access channel that is reasonably associated with a number of collisions.

In wireless communication systems such as CDMA systems, the interference on the reverse link in closely related to the carried loading in the system. If the loading in the system is small while the total interference is high, for example, that provides an indication that there might be many access attempts that are not getting through. The high number of access attempts causes the high interference level. When the determined received signal strength has a relationship to the interference level that is outside of a selected range, the determination at 60 includes a conclusion that the access medium 24 is congested or overloaded. Given this description, those skilled in the art will realize what received power and interference levels for their particular situation will provide an indication of congestion or overload.

Another technique is included in the example of FIG. 2. At 62, a condition is detected that is likely to correspond to congestion or overload on the access channel. Such a condition allows for predicting overload even though it may not yet have occurred and without making actual measurements or determinations regarding existing access channel conditions. When such a condition occurs, congestion or overload is assumed and preemptive action can be taken to avoid the actual occurrence of instability on the access medium.

One example condition that is likely to result in overload on an access medium is scheduled network maintenance or configuration. For example, system parameters and configurations will sometimes need updating. Such information is provided to all users through a broadcast message, for example. The corresponding changes will sometimes cause the users to send access attempts to request updating the user information, also. For example, in a wireless communication system, users may request a universal access terminal identification if the system changes its code for a particular network component. Such a situation has the potential to overload the access medium. In the event this happens abruptly, the access medium loading changes abruptly, also.

It is desirable to recognize the potential for such a situation and to predict the likelihood of corresponding overload. The illustrated example includes using information such as times associated with pre-scheduled maintenance or configuration operations for predicting when overload may occur.

Another example situation where there is a predictable, abrupt increase in access attempts is during an emergency situation when more users are likely to attempt to make a call than otherwise may happen. In many local emergency situations such as a natural disaster, for example, many users try to access the communication network 22 essentially at the same time. The loading on the access medium 24 at such times is much larger than in normal, everyday situations. One example includes an ability to trigger a recognition of the likelihood of overload whenever an emergency situation is detected. Given this description, those skilled in the art will be able to configure an appropriate portion of their particular network to accept suitable information indicating such a situation and to responsively provide an indication that overload control is desired to meet the needs of their particular situation.

In one example, whenever at least one of the determinations at 44 or the prediction at 62 indicates that the access medium is (at least expected to be) congested or overloaded, at least one technique is implemented at 64 for managing access attempts to stabilize the access channel by reducing or eliminating the congested or overloaded condition. Controlling overload or congestion at 64 in the illustrated example includes three techniques. Some examples include using one of the techniques while other examples include using a combination of two or all three of them.

One example technique is shown at 66 where access attempts are throttled to reduce the number of attempts for at least a selected amount of time. In one example, the network 22 directs at least some access terminals 26-34 to stop attempting to access the medium 24. The network 22 selects the users with lower access priority in one example. In another example, the users are randomly selected. This is accomplished in one example through a broadcast message from the network 22 that changes an access persistence parameter, which is used by an access terminal to control a probability that the terminal will send an access request. When the probability is zero, the access terminal will not send a request.

After an appropriate time the access terminal can increase the parameter above zero so that an attempt to initiate a new call or flow can be accomplished. In other words, the affected access terminals will not be effectively rendered unusable by having their access persistence parameter permanently set to zero.

In one example, the percentage of throttled users whose persistence parameter probability should be changed to zero is determined by the relationship: $\rho_{user} = (\rho - \rho_{th})/\rho$ where $\rho$ is the access medium occupancy and $\rho_{th}$ is the access medium occupancy threshold.

Another technique is schematically shown at 68. This technique includes smoothing out a traffic burst on the access medium to reduce the loading. In this example, the network 22 sends a broadcast message with a smaller access persistence parameter so that each user will reduce its access attempt rate. The new access persistence parameter in one example is determined using the relationship $\alpha_{persistence\_new} = (\rho_{th}/\rho)\alpha_{persistence\_old}$. This technique effectively slows down the rate of access attempts of all access terminals.

The techniques shown at 66 and 68 may be implemented for a preselected time period or until a determination is made that there no longer is congestion or overload on the access medium 24. For example, the broadcast message indicating that the persistence parameter probability should be reduced may include a time during which the reduced probability should be used by an affected access terminal. In one example, at least some of the access terminals have an ability to automatically reset the persistence parameter to a default value after a selected time.

Another example technique is included at 70. With this technique, the access traffic loading is reduced by adjusting the access medium parameters (e.g., the access channel structure). In one example, each access attempt consists of a number of probe sequences, which each consist of a number of probes. Whenever overload is detected, the number of probe sequences, the number of probes in a sequence or both is selectively reduced to relieve the loading for stabilizing the access medium. This technique essentially changing at least one of the back off time, the number of probes or the number of probe sequences used by the access terminals.

By recognizing when a congestion or overload condition occurs on an access medium, the above example provides the ability to better manage the capacity of an access medium, which has the advantage of improving overall system throughput and performance in some examples.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating, comprising
   determining whether at least one condition indicates that an amount of attempts to access an access medium corresponds to an overload of a capacity of the access medium;
   determining a received power that is received by at least one base station;

determining a corresponding interference level at the at least one base station; and determining if a relationship between the determined received power and the determined interference level indicates that the received power is lower than expected for the determined interference level such that the relationship indicates the overload.

2. The method of claim 1, comprising
determining an average number of probes associated with at least some received access messages; and
using the determined average number of probes as an indicator of the amount of attempts.

3. The method of claim 2, comprising
determining that the overload exists if the determined average number of probes exceeds a selected threshold.

4. The method of claim 1, comprising
determining an occupancy level on the access medium; and
determining if the determined occupancy level exceeds a threshold corresponding to the overload.

5. The method of claim 4, comprising
determining the occupancy level by determining a relationship between
a number of seizures within a time period and
the access medium capacity over the time period.

6. The method of claim 1, wherein the at least one condition comprises a condition predetermined and expected to correspond to the overload; and comprising
predicting that the overload will occur at a time corresponding to the at least one condition.

7. The method of claim 6, wherein the at least one predetermined condition comprises at least one of a communication network maintenance procedure, a communication network configuration procedure or an emergency situation.

8. The method of claim 1, comprising
reducing the amount of access attempts responsive to determining that the at least one condition indicates the overload.

9. The method of claim 8, comprising
broadcasting a message to at least some users indicating that an access persistence parameter of the at least some users should be reduced.

10. The method of claim 9, comprising
indicating that the access persistence parameter should be reduced to zero.

11. The method of claim 9, comprising
indicating that the access persistence parameter should be reduced by a factor corresponding to a value based on a selected occupancy threshold divided by a current access medium occupancy level.

12. The method of claim 8, comprising
determining a percentage of users for the reducing as a function of a current access medium occupancy level and a selected occupancy threshold.

13. The method of claim 8, comprising
adjusting at least one access medium parameter to reduce the amount of access attempts.

14. The method of claim 13, comprising
adjusting at least one of a back off time, a number of probes or a number of probe sequences used by access terminals making access attempts.

15. A method of communicating, comprising
reducing an amount of access attempts on an access medium responsive to at least one condition that indicates an amount of access attempts corresponding to an overload of a capacity of the access medium;
broadcasting a message from at least one base station to at least some users indicating that an access persistence parameter of the at least some users should be reduced; and
indicating that the access persistence parameter should be reduced by a factor corresponding to a value based on a selected occupancy threshold divided by a current access medium occupancy level.

16. The method of claim 15, comprising
indicating that the access persistence parameter should be reduced to zero.

17. The method of claim 15, comprising
determining a percentage of users for the reducing as a function of a current access medium occupancy level and a selected occupancy threshold.

18. The method of claim 15, comprising
adjusting at least one access medium parameter to reduce the amount of access attempts.

19. The method of claim 18, comprising
adjusting at least one of a back off time, a number of probes or a number of probe sequences used by access terminals making access attempts.

20. A method of communicating, comprising:
reducing an amount of access attempts on an access medium responsive to at least one condition that indicates an amount of access attempts corresponding to an overload of the capacity of the access medium;
receiving a message at a user device configured to communicate over the access medium, the message indicating that an access persistence parameter should be reduced; and
reducing the access persistence parameter by a factor corresponding to a value based on a selected occupancy threshold divided by a current access medium occupancy level.

* * * * *